US011138400B2

(12) United States Patent
Dorier et al.

(10) Patent No.: US 11,138,400 B2
(45) Date of Patent: Oct. 5, 2021

(54) MARK AUTHENTICATION FROM LIGHT SPECTRA

(71) Applicant: SICPA HOLDING SA, Prilly (CH)

(72) Inventors: Jean-Luc Dorier, Bussigny (CH); Sandro Saitta, Epalinges (CH)

(73) Assignee: SICPA HOLDING SA, Prilly (CH)

( * ) Notice: Subject to any disclaimer, the term of this patent is extended or adjusted under 35 U.S.C. 154(b) by 178 days.

(21) Appl. No.: 15/024,602

(22) PCT Filed: Sep. 23, 2014

(86) PCT No.: PCT/EP2014/070211
§ 371 (c)(1),
(2) Date: Mar. 24, 2016

(87) PCT Pub. No.: WO2015/044123
PCT Pub. Date: Apr. 2, 2015

(65) Prior Publication Data
US 2016/0232733 A1 Aug. 11, 2016

(30) Foreign Application Priority Data

Sep. 25, 2013 (EP) .................................... 13185920

(51) Int. Cl.
G06K 7/12 (2006.01)
G07D 7/202 (2016.01)
(Continued)

(52) U.S. Cl.
CPC ............. *G06K 7/12* (2013.01); *G06K 7/1417* (2013.01); *G06N 5/022* (2013.01); *G07D 7/1205* (2017.05); *G07D 7/202* (2017.05); *G07D 7/205* (2013.01)

(58) Field of Classification Search
CPC ........ G01N 21/64; G07D 7/12; G07D 7/1205; G07D 7/122; G07D 7/202; G07D 7/205; G06K 7/12; G06K 7/1417; G06N 5/022; B32B 2307/422; B32B 27/18; B42D 2035/34; B42D 25/387
See application file for complete search history.

(56) References Cited

U.S. PATENT DOCUMENTS 6,995,839 B1 2/2006 Shapiro
2006/0088207 A1* 4/2006 Schneiderman ... G06K 9/00241
382/159

(Continued)

FOREIGN PATENT DOCUMENTS

WO WO2011/130804 10/2011

*Primary Examiner* — Kyle R Quigley
(74) *Attorney, Agent, or Firm* — Muncy, Geissler, Olds & Lowe, P.C.

(57) ABSTRACT

Authenticating a mark having a marker that emits light under illumination, involving an obtaining of a light spectrum from the mark, the light spectrum having values, each value indicating a light intensity of the light emitted from the mark for a corresponding wavelength, an applying of a set of rules onto the values of the light spectrum to obtain a first result indicating whether the mark is authentic or not, an applying of statistical processing onto the values of the light spectrum to obtain a second result indicating whether the mark is authentic or not, and a generating of an output result indicating whether the mark is authentic or not from the first result and the second result.

11 Claims, 3 Drawing Sheets

(51) Int. Cl.
    *G07D 7/1205*   (2016.01)
    *G06K 7/14*     (2006.01)
    *G06N 5/02*     (2006.01)

(56) References Cited

U.S. PATENT DOCUMENTS

| | | | |
|---|---|---|---|
| 2008/0025555 A1 | 1/2008 | Visan et al. | |
| 2008/0129037 A1 | 6/2008 | Roth et al. | |
| 2009/0319244 A1* | 12/2009 | West | G06K 9/6282 703/11 |
| 2010/0070457 A1* | 3/2010 | Kejariwal | G06N 99/005 706/59 |
| 2010/0102250 A1* | 4/2010 | Li | C09K 11/0883 250/459.1 |
| 2010/0149531 A1 | 6/2010 | Tang | |
| 2010/0205124 A1* | 8/2010 | Ben-Hur | G06N 20/00 706/12 |

* cited by examiner

MARK AUTHENTICATION FROM LIGHT SPECTRA

CROSS-REFERENCE TO RELATED APPLICATIONS

The present application is a National Stage Application of International Application No. PCT/EP2014/070211 filed Sep. 23, 2014, which published as WO 2015/044123 A1 on Apr. 2, 2015, the disclosures of which are expressly incorporated by reference herein in their entireties. Further, the present application claims priority to European Application No. 13185920.9, filed Sep. 25, 2013, the disclosure of which is expressly incorporated by reference herein in its entirety.

BACKGROUND OF THE DISCLOSURE

1. Field of the Disclosure

The present disclosure relates to authenticating marks from light spectra. Specifically, the present disclosure relates to a method of authenticating a mark, a device configured to authenticate a mark, and to corresponding computer programs and computer program products. The present disclosure also relates to hand-held or fixed type devices adapted to acquire a light spectrum from a mark and configured to authenticate the mark from the acquired light spectrum.

2. Background Description

The concept of marking and authenticating the corresponding marks is found in more and more fields of application. Generally, some party provides a specific mark to an item so that another party can later authenticate the mark for making conclusions on whether or not the item to which the mark belongs is genuine or not, i.e. whether or not the item under question originates from the correct party. Items in this sense can be any one of individual products and packages, such as consumer products, cigarette packages, alcoholic/non-alcoholic beverages, perfumes, and the like, or also documents, certificates, passports, ID cards, tickets, currency bills, number plates, etc.

While the concept of issuing and authenticating marks is known for long, recent times have seen the development of sophisticated marks that are more and more difficult to counterfeit by third parties pursuing unlawful interests. Specifically, on the one hand, the design of the marks can contribute to enhancing the robustness against forgery, by—amongst others—printing the mark with special equipment providing thin and high resolution features difficult to copy or encoding information into the mark that allows for distinguishing genuine codes from non-genuine codes by processing the encoded information. With regard to the latter, the mark may comprise a one- or two-dimensional bar code with which a relatively large amount of information can be encoded in relatively small characters. The concepts of encryption and digitally signing may render it difficult, if not virtually impossible, to generate forged codes that would not be detected as an unlawful copy by an authorized party.

On the other hand, however, also characteristics and properties of the mark as such can provide effective approaches for enhancing the robustness against forgery. Specifically, printed marks can employ particular inks or dyes with specific (e.g., unique) properties that are difficult to reproduce without the knowledge and/or equipment of an authorized party. Such inks (e.g., dyes) can be designed to feature specific and well-defined optical properties including characteristic reflection, fluorescence, and/or phosphorescence spectra. In this way, the use of such inks/dyes allows the mark to emit a specific and distinct light spectrum when subject to illumination. Verifying the presence of the distinct optical response can thus be employed for authenticating the mark.

Whilst some sophisticated mark features can be detected and thus verified with the naked eye, there are—of course—various features and characteristics of modern marks that require more or less special equipment for authenticating a mark. Quite common and less special equipment are ultraviolet (UV) light sources that allow one to determine the presence of fluorescence on marks, for example attached to currency bills. For more complex tasks there are available special readers or authentication devices that usually combine all necessary components, such as an illumination light source, a light detector as well as processing and displaying equipment so as to allow a user to easily scan a mark and to more or less instantly receive information indicating the authenticity of the mark. Generally, a light detector in the context of the present disclosure is any detector for detecting the properties of light emitted from the mark, including at least a part of its light spectrum, i.e. information on light intensity vs. wavelength. It is clear that such authenticating devices should be made available as hand-held portable device for in-field inspections by, for example, security personnel, customs and/or tax authorities and the like. At the same time, however, also fixed type equipment is required for automated applications in, for example, production, packaging, or distribution lines.

Conventional devices and concepts firstly obtain acquired spectral data that indicates an intensity distribution (vs. frequency or wavelength) of the light emitted from a mark and its surroundings and then, secondly, analyze the obtained data so as to provide a result indicating whether or not the mark can be assumed as genuine. At the same it should be clear that such devices and concepts must be compatible with the real-life situations of in-field inspections or within automated processing lines. Most notably, any acquired spectral data will also include response by surroundings of the mark such as parts of a product package or a currency bill onto which the mark is attached. Furthermore, the background behind the mark, e.g. the carrier material of a package, can variably influence the light emitted from the mark and, in turn, the background will also affect any measured/acquired light spectrum. Yet further, there will be contributions from illumination other than from the device or the employed light source, e.g., daylight, facility and street illumination and the like. Yet further, the mark may be covered by (transparent) packages or coatings, soiled, contaminated, or altered in another way.

These practical aspects show that the employed devices and concepts need to cope with many variations and influences in order to still be able to produce a sufficiently reliable output under various conditions. Unfortunately, the existing solutions still do not provide a reliable authentication result under varying conditions with the consequence that the number of both false positive and false negative authentication results is still too high.

There is therefore a need for improved methods of authenticating marks, related devices, computer programs, and computer program products, which allow for a higher reliability in determining an authentication results under various conditions. At the same time, these solutions need to be sufficiently fast and efficient so that their respective application in hand-held devices and (fast) processing lines is made possible without disproportionate requirements on the involved power and processing resources.

SUMMARY OF THE DISCLOSURE

The above-mentioned aims and problems are solved by the subject matter of the independent claims. Further preferred embodiments are defined in the dependent claims.

According to one aspect of the present disclosure, there is provided a method of authenticating a mark comprising a marker that emits light under illumination, the method comprising obtaining a light spectrum from the mark, the light spectrum comprising values, each value indicating a light intensity of the light emitted from the mark for a corresponding wavelength, applying a set of rules onto the values of the light spectrum to obtain a first result indicating whether the mark is authentic or not, applying statistical processing onto the values of the light spectrum to obtain a second result indicating whether the mark is authentic or not, and a step of generating an output result indicating whether the mark is authentic or not from the first result and the second result.

According to another aspect of the present disclosure, there is provided a device for authenticating a mark comprising a marker that emits light under illumination, the device comprising processing resources being configured to obtain a light spectrum from the mark, the light spectrum comprising values, each value indicating a light intensity of the light emitted from the mark for a corresponding wavelength, apply a set of rules onto the values of the light spectrum to obtain a first result indicating whether the mark is authentic or not, apply statistical processing onto the values of the light spectrum to obtain a second result indicating whether the mark is authentic or not, and to generate an output result indicating whether the mark is authentic or not from the first result and the second result.

According to further aspects of the present disclosure there are provided corresponding computer programs and computer program products that comprise code executable by processing resources/units so as to implement embodiments of the present disclosure.

BRIEF DESCRIPTION OF THE DRAWINGS

Embodiments of the present disclosure, which are presented for better understanding the inventive concepts and which are not the same as limiting the disclosure, will now be described with reference to the figures in which.

DETAILED DESCRIPTION OF EMBODIMENTS OF THE DISCLOSURE

Figure 1A:
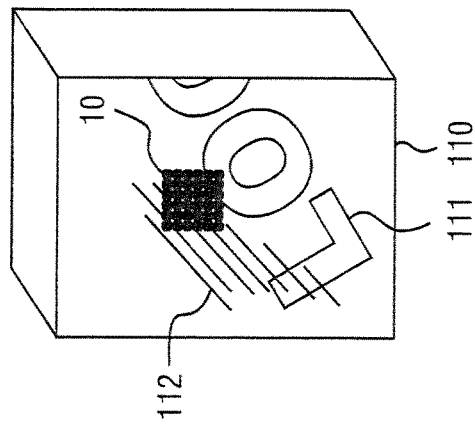
FIGS. 1A to 1C show schematic views of marks attached to respective items according to embodiments of the present disclosure.

FIG. 1A shows a schematic view of a mark attached to an item according to an embodiment of the present disclosure. Specifically, an exemplary item 110 is shown as a package. This package may, for example, contain a tradable good, such as a consumer product, an electronic device, food, alcoholic or non-alcoholic beverages, tobacco products (cigarettes, cigars, loose tobacco, etc.), and the like. A mark 10 is attached to item 110 by any suitable technique including printing the mark 10 directly onto a package or applying an adhesive sticker with mark 10 to the package. It may also be conceivable to attach the mark to the product as such, wherein—as long as the implementation permits—the mark can be directly attached to for example a housing of an electronic device.

Usually, the item 110 (package, product, etc.) has some design features 111 on its surface. Common examples are multi-color and graphically designed logos, brand names, product descriptions, hazard warnings, and the like that are printed or applied in any other suitable fashion to a package/product surface. Thus, mark 10 can generally overlap with such features 111 and there should be as few as possible restrictions regarding the design, appearance, and optical characteristics of features 111 and also regarding the positioning of mark 10 relative to features 111. Furthermore, some kind of cover 112 may be arranged on top of the package surface and—with this—also mark 10. Examples for cover 112 include protective coatings, such as transparent plastic films, transparent lacquer films, and the like. Moreover, package 110 may also be subject to contamination and dirt, so that cover 112 may be in the form of an irregular and uncontrollable accumulation of dust/dirt particles or dried liquids. In addition to this, the mark (and/or the background, surrounding, etc.) may also be subject to alteration by exposure to sunlight during lifetime of the product in the field, which may alter the optical properties and with this the spectral characteristics and properties.

As regards automated authentication of mark 10 attached to any given item 110, especially the overlap with the mentioned features 111 and/or coatings/contaminations 112 may play a more or less pronounced role, since these factors may influence and contribute to the light spectrum that is acquired from mark 10 in the state of being attached to item 110. Therefore, it will be generally difficult to acquire a light spectrum from mark 10 without having spectral contributions from parts and properties of the item, such as the features 111, package/surface materials, covers, contaminations, etc. As regards the formerly mentioned features 111, it is clear that related designs usually employ various color dyes and possibly also metallic and/or glossy coatings. All this will naturally contribute to the light that is detected from mark 10 attached on item 110.

However, the precise characteristics of the used dyes/markers and coatings are generally unknown and may also vary over time as manufacturers change the package design, change the materials and dyes used, or change the printing and manufacturing processes involved. Further, cover 112 will also influence the light spectrum being acquired from mark 10 on item 110. Since cover 112 is assumed to be on top of mark 10, the main influences are assumed to stem from absorption, reflection, and fluorescence.

Figure 1B:
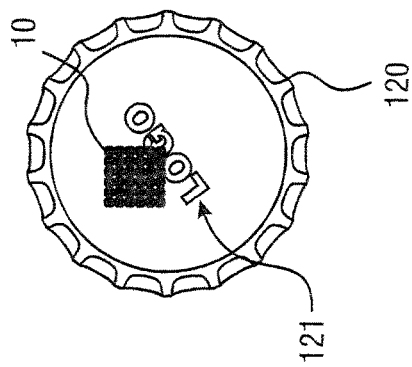

FIG. 1B shows a schematic view of a mark attached to an item according to an embodiment of the present disclosure. According to this embodiment, mark 10 is attached to the product itself in the sense of a cap 120 of a bottle. Again, also cap 120 may provide features 121 that can overlap with mark 10. Usually, the positioning of mark 10 relative to the design features 121 on cap 120 remain uncontrolled, considering the high speed and usual configuration of corresponding bottle filling lines. Specifically, individual bottles may pass by fast any employed processing, filling, or labelling stage, so that a well-defined and reproducible relationship between mark 10 and features 121 on cap 120 can be difficult to obtain. In addition to this, the position and appearance of the features 121 on cap 120 may again vary. Moreover, the material of cap 120 may vary or may provide varying optical characteristics even though the material remains identical. The latter can be especially observed in the case of metal caps that naturally feature a varying surface quality.

Figure 1C:
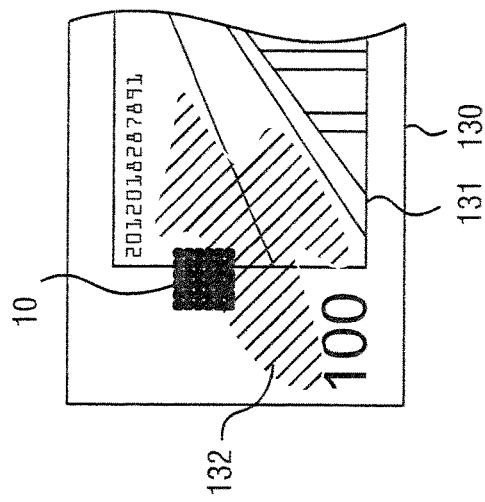

FIG. 1C shows a schematic view of a mark attached to an item according to an embodiment of the present disclosure. Specifically, an exemplary currency bill 130 generally represents a document or certificate. Currency bill 130 naturally comprises design features 131 usually depicting the bill denomination, serial numbers, pictures, etc. Of course, currency bill 130—as generally any document/certificate—can be subject to contamination 132 which may influence mark 10 on bill 130.

Figure 2A:
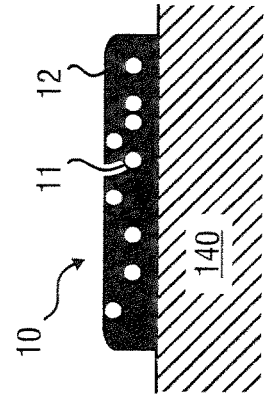
FIG. 2A shows a schematic and magnified side view of a mark in the state of being attached to a surface of an item according to an embodiment of the present disclosure.

FIG. 2A shows a schematic and magnified side view of a mark in the state of being attached to a surface of an item. Specifically, mark 10 is shown as attached to the surface of an item 140 and includes marker particles 11 of one or more type in some kind of binder/carrier matrix 12. In general, said marker particles are meant to denote the elements that provide a specific optical response. These marker particles my comprise dye particles, such as pigments, or result from a soluble dye after evaporation of the solvent. The binder/matrix 12 may comprise any substance (e.g. a resin) suitable for holding the marker particles 12 and forming a sufficiently stable mark 10. The characteristic optical properties of mark 10 may be obtained by a specific composition and design of the employed dye particles 11. For example, particles of one single type may be diluted in matrix 12 so as to provide mark 10 with a specific spectral response. Further, also a mixture of particles of several types may obtain the overall spectral response. It is to be noted that matrix 12 may only be necessary in cases where particles 11 alone are not able to form a stable and reliable mark 10. In the other cases where the particles 11 can adhere sufficiently enough to an item surface, it can be of course dispensed with any matrix material 12.

Regarding the formation (printing) of mark 10 onto an item surface it is to be noted that various techniques may apply. One example is application by using a liquid ink that comprises the dye particles 11 and the carrier matrix 12 as an aqueous or other solution and forms a stable mark 10 on the surface once the solvent (water, etc.) has evaporated. In general, the term "ink" denotes the substance used to generate a mark, and "dye", "marker", and "pigment" the substance that provides a desired optical response in the ready mark. When the mark is printed, for example using liquid ink, such ink will be usually some dye in aqueous or some solvent solution. After the water or solvent has evaporated, the mark contains the dye, marker, or pigment of the ink. However, the term "ink" is also meant to include non-liquid printing precursors such as toner powder and the like.

In the context of the present disclosure, a light spectrum is the measured intensity distribution along wavelength of light emitted from the mark when subject to illumination. Usually, such illumination is performed with a "white" light source or a light source with some given spectrum, e.g., a red, infrared (IR), or ultraviolet (UV) light source. The aforementioned white light source refers to light sources whose emission intensity is (apparently) approximately constant over the visible wavelength range. The emitted light spectrum may further include fluorescent and/or phosphorescent contributions. The former fluorescent contributions comprise light that is emitted with another (usually longer) wavelength as compared to the wavelength of illumination, and the latter phosphorescent contributions add a decay characteristic so that light is emitted back from the dye even during some well-defined time after illumination has ceased. Hence, the knowledge and analysis of conversion rates by fluorescence and the decay characteristics originating from phosphorescence may thus also be employed for authenticating a mark with a corresponding fluorescent and/or phosphorescent dye. As a consequence, the present disclosure encompasses embodiments in which a mark is not visible to the naked eye. Nevertheless, in some embodiments fluorescence may provide inspection by humans under specific illumination.

Figure 2B:
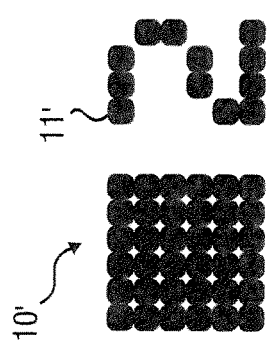
FIGS. 2B and 2C show exemplary layouts of marks according to embodiments of the present disclosure.

FIG. 2B shows one exemplary layout of a mark. According to this embodiment, a mark 10' is obtained by dot-matrix ink-printing so as to form graphical symbols, characters, numbers, and the like, by a respective arrangement of individual dots 11'.

Figure 2C:
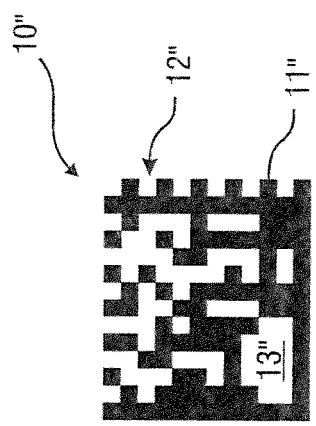

Similarly, FIG. 2C shows another exemplary layout of a mark wherein also a matrix arrangement is employed for dots of a two-dimensional bar code as a mark 10". Although other implementations and standards can be employed, this embodiment is described with the example of the GS1 (Trademark) DataMatrix ECC 200 standard (GS1 being an international association providing standards for two-dimensional barcodes). This two-dimensional bar code comprises a data area 13" in which payload data of the bar code can be encoded by an arrangement of first and second type elements 11" and 12". For example, elements of one type can be formed by printing them with ink. In this way, mark 10" can be formed providing specific optical properties as well as encoded information both usable for authentication.

Figure 3A:
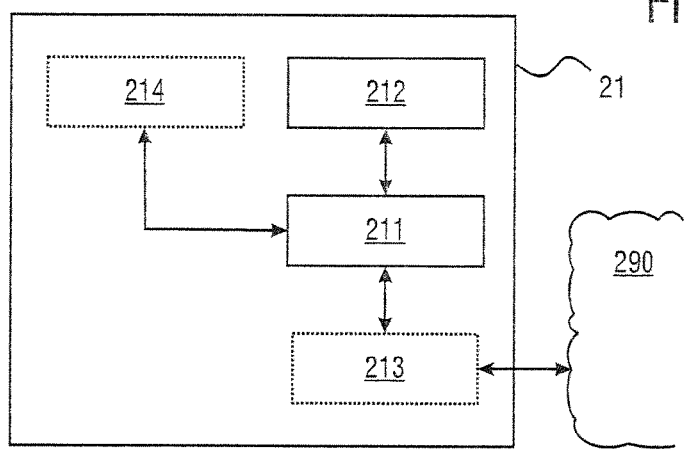
FIG. 3A shows a general apparatus embodiment of the present disclosure.

FIG. 3A shows a general apparatus embodiment of the present disclosure. Specifically, there is a schematic representation of an apparatus 21 comprising a processing unit 211 and a memory unit 212. The memory unit 212 may store code that, when executed on the processing unit 211, implements one or more method embodiments of the present disclosure. Optionally, the apparatus 21 may comprise an acquisition unit 214 for acquiring a light spectrum. The acquisition unit 214 can be in form of a CCD (charged coupled device) sensor/camera arranged for providing light spectrum data indicating light intensities for corresponding wavelengths. For such purposes, additional elements, such as optical filters, wavelength dispersers, spectrometers, and the like, can be included in the acquisition unit 214. Therefore, also filter- or spectrometer-type devices can be employed in place of or in combination with the mentioned CCD sensors.

In addition to this, the device can be configured to control illumination during acquisition of the light spectrum by an internal or external light source. Said light source can be arranged to emit a well-defined light spectrum so that a response from an object (item, mark, etc.) can be easily analyzed for the optical properties of the object. For example, the configuration may include switching the light source on only during acquisition or also to emitting a sequence of light pulses, each having a different light emission spectrum. Further, apparatus 21 may comprise a communication unit 213 for communicating an authentication result, acquired data or command data to or from other entities, such as servers, controllers and the like. The communication may be effected over a network, such as a local area network (LAN), wireless network (WLAN), the internet, and the like. Further, bus systems, such as CAN, can also be employed for data exchange.

Figure 3B:
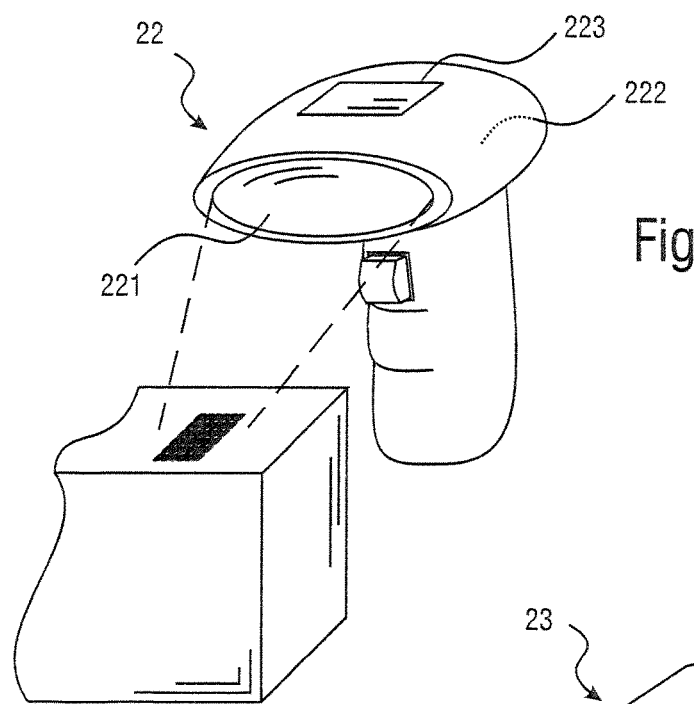
FIG. 3B shows a schematic view of a handheld embodiment of a device for authenticating a mark.

FIG. 3B shows a schematic view of a handheld embodiment of a device for authenticating a mark. The device 22 comprises a window 221 through which a light spectrum from a mark usually attached to an item can be acquired. As shown, a mark is applied to an item and placed in the field of view of device 22. The device 22 further comprises integrated processing equipment 222, usually including a processing unit, a memory unit, and possibly also a communication unit. Besides one or more (optional) operation buttons, device 22 may also comprise a display 223 for communicating an authentication result to a user. In case of display 223 being a touch-sensitive display, it can be dispensed with any further operation buttons/elements, since device operation can be fully facilitated by a touch screen. The device 22 may also comprise an optional light source for illuminating a mark or a surrounding of a mark on an item during the acquisition of the light spectrum. Yet further, additional notifiers may be provided for acoustically notifying an authentication result to a user.

Figure 3C:
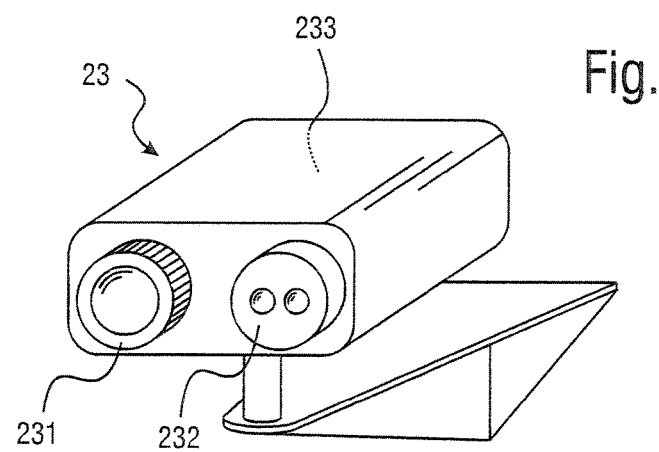
FIG. 3C shows a schematic view of a fixed-type embodiment of a device for authenticating a mark.

FIG. 3C shows a schematic view of a fixed-type embodiment of a device for authenticating a mark. For example, a module operable to be mounted on a production/distribution line for detecting bar codes disposed on items transported on said line. The device 23 comprises a window 231 through which a light spectrum from a mark usually attached to an item can be acquired. The device 23 further comprises integrated processing equipment 233, usually including a processing unit, a memory unit, and possibly also a communication unit. Besides one or more (optional) operation buttons, device 23 may also comprise an optional light source 232 for illuminating a mark or a surrounding of a mark on an item during the acquisition of the light spectrum. An additional fixation element may be provided for mounting the device 23 at, for example, a production line in which a plurality of items pass by the device for authentication. The device may, of course, take other forms and may be wirebound or wireless.

In the embodiments described in conjunction with any one of FIGS. 3A, 3B, and 3C, the processing resources (or processing and memory units) are configured to implement one or more method embodiments of the present disclosure, and, more specifically, to implement a method of authenticating a mark comprising a marker that emits light under illumination. In this way, a device for authenticating a mark can be realized. The configuration employs first obtaining a light spectrum from the mark, wherein the light spectrum comprises values indicating a light intensity of the light emitted from the mark for a corresponding wavelength. This light spectrum may be in line with the corresponding embodiments of the present disclosure. Then a set of rules is applied onto the values of the light spectrum to obtain a first result indicating whether the mark is authentic or not, and a statistical processing is applied onto the values of the light spectrum to obtain a second result indicating whether the mark is authentic or not.

It is to be noted that the embodiments of the present disclosure are not limited to this order, but, namely, the decision tree can be evaluated after the statistical processing or even in parallel. In the case that there is more than one set of rules or more than one decision tree to be evaluated, or that there is more than one statistical processing, the actual order of execution can be chosen to suit best the actual implementation. In any way, however, there need to be at least two results available, i.e. the above-mentioned first and second results, for subsequently generating an output result indicating whether the mark is authentic or not from the first result and the second result. The former output result can then be communicated to a user or to some entity via respective communicators, such as a communication unit, a network, and/or a display unit.

Figure 4:
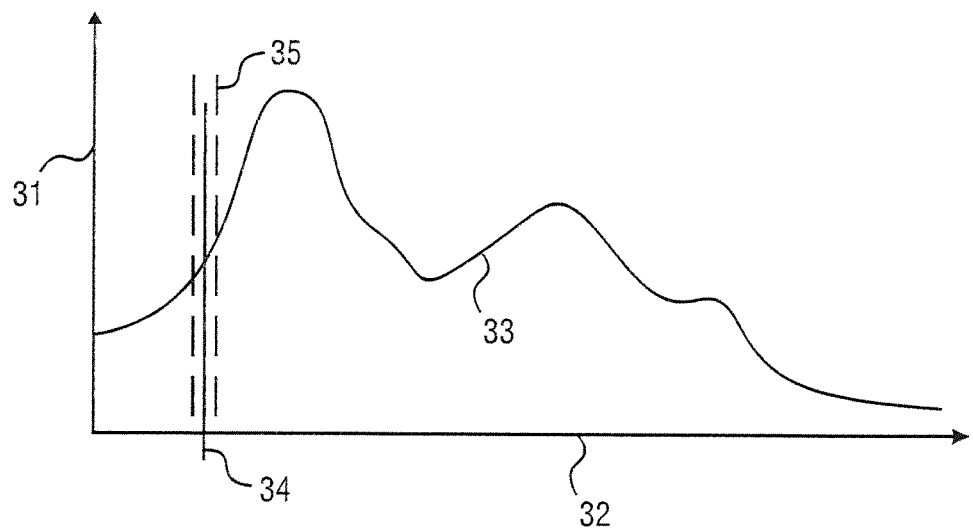
FIG. 4 shows a schematic view of an exemplary light spectrum.

FIG. 4 shows a schematic view of an exemplary light spectrum. Generally, a light spectrum comprises a set of values wherein each value indicates a light intensity for a corresponding wavelength. Following this general configuration, the spectrum can be drawn as a curve 33 along a first axis 32 with a dimension relative to light wavelength ($\lambda$) and a second axis 31 indicating a corresponding light intensity value. For the purpose of the present disclosure there is no need for a specific dimension of the values indicating a light intensity, as long as the values provide sufficient information on distinguishing mark response for different wavelengths. For example, values in the range mappable by common variable types (byte, word, etc.) may fully suffice.

As shown in the example of FIG. 4, and assuming that longer wavelengths are drawn toward the right direction on the first axis 32, the exemplary curve 33 shows an intensity peak toward shorter wavelengths and gradually decays toward longer wavelength. However, the actual spectral response of a mark, and the combined response of the mark and parts of the item to which the mark is attached can take any form according to its actual optical properties. Specifically, no distinct peaks need to be present or even any number of a plurality of peaks can be present. Further, there is no need for an intensity decay toward longer and/or shorter wavelengths.

In the context of the present disclosure, it should be further understood that one value indicating a respective light intensity of the light spectrum is not given necessarily for a precise value of the wavelength, but usually for a narrow wavelength band. Therefore, some position 34 on the first wavelength axis 32 may be defined by a single value for a wavelength but may actually define a band 35 of a wavelength range in the vicinity of value 34. Within such a wavelength band 35 the corresponding light intensity can be integrated and/or averaged so as to represent one measuring point for value 34 of curve 33. Therefore, the apparent continuity of curve 33 is shown for demonstration purposes only.

Figure 5:
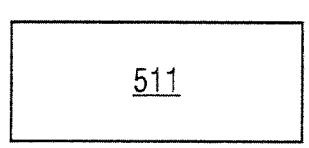
FIG. 5 shows a flowchart of a basic method embodiment of the present disclosure.
Figure 5:
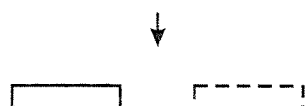
Figure 5:
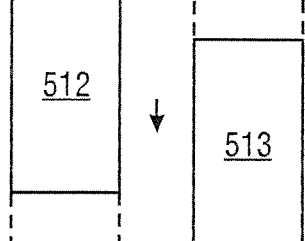

FIG. 5 shows a flowchart of a basic method embodiment of the present disclosure. Specifically, this embodiment implements a method of authenticating a mark comprising a dye that emits light under illumination. These method embodiments involve a step 511 (=OBTAINING LIGHT SPECTRUM) of obtaining a light spectrum from the mark, the light spectrum comprising values, each value indicating a light intensity of the light emitted from the mark for a corresponding wavelength. Then, in step 512 (=APPLY/EVALUATE SET OF RULES) and step 513 (=APPLY/EVALUATE STATISTICAL PROCESSING) a set of rules, e.g., in the form of a decision tree, is applied onto the values of the light spectrum to obtain a first result indicating whether the mark is authentic or not and statistical processing is applied onto the values of the light spectrum to obtain a second result indicating whether the mark is authentic or not. Once these at least two results are available, an output result is generated in step 514 (=GENERATING OUTPUT RESULT), this output result indicating whether the mark is authentic or not from the first result and the second result.

As already mentioned, the order of steps 512 and 513 can be chosen to suit best the actual implementation. Further, there can be a plurality of decision trees to be evaluated and also there can be a plurality of statistical processing of the light spectrum. Once all applicable decision trees have been evaluated and all applicable statistical processing has completed, there will be available a number of—at least two—results indicating whether the mark is authentic or not. From this plurality of "intermediate" results a "final" output result can be generated. This can be in turn effected in any suitable fashion and includes, for example, a voting approach, a majority determination, a weighting of the intermediate results, another decision tree, thresholding, and the like. More specifically, the individual results can be optionally weighted by some suitable form of weighting factor and an average can be calculated. If the average exceeds some predetermined value, a corresponding output result can be generated.

Generally, the use of at least two "intermediate" results to generate an output result can provide various advantages. Firstly, the consideration of more than one mechanism (in the sense of one single decision tree or one single statistical processing) allows for substantially enhancing reliability, robustness, and the quality of the output result. Namely, the number of false positive determinations (i.e., a mark was found to be authentic while it is not) and false negative determinations (i.e., a mark was found to be not authentic while it is authentic) can be reduced. Specifically, if one decision tree yields a somewhat vague result (near 50% of authenticity) a second decision tree can still compensate for the insufficient first result.

Secondly, the consideration of more than one concept (in the sense of evaluating only one or more decision tree or considering only statistical processing) allows for further enhancing reliability and the quality of the output result. Namely, if one input light spectrum is such that it is difficult to authenticate with the decision tree concept (e.g., the first result is near to 50%), then there is still the chance to come to a sensible and possibly correct output result when the result from the statistical processing is taken into account.

Generally, the aforementioned weighting can such that indifferent results, i.e. results that fall into some predetermined range (e.g., results in the range of 40%-60%), are weighted less, while more definite results, i.e., results outside a predetermined range (e.g., results not in the range of 20%-80%) are enhanced by a corresponding weighting factor. In all, the combined approach of having more than one concept allows for substantially improving reliability and can thus provide a greater efficiency and reliability in automated mark authentication. More specifically, the improvements can be obtained by combining two intrinsically different or complementary concepts, i.e., the first result from, e.g., a decision tree and second result from a statistical procedure. In other words, if, for example, the first result is not reliable (e.g., because of some particular combination of mark and background) the second result can still perform well and "save" the overall result.

Figure 6:
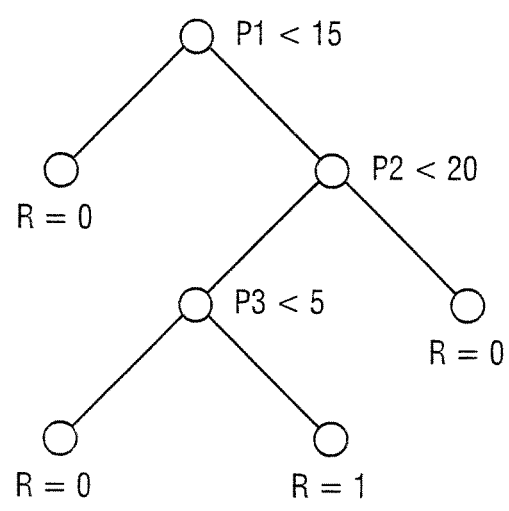
FIG. 6 shows a schematic view of an exemplary decision tree.

FIG. 6 shows a schematic view of an exemplary decision tree as one possible implementation of a set of rules. In general terms, a decision tree is a sequence of one or more decisions to be evaluated based on input figures. The exemplary decision tree of FIG. 6 involves three decisions comparing three input figures P1, P2, and P3 to respective reference values. Each decision either yields a result (e.g., R=0 or R=1) or leads to a next decision considering other input and/or other reference figures. In the meaning of the present disclosure, a decision tree thus defines any sequence of decisions evaluated for a given input relative to given reference figures so as to obtain a decision result. Naturally, an implementation of a decision tree can be in form of rules or code which, in turn, can be defined using a command language, programming language, query language, etc.

Other implementations for a set of rules include the definition of rules, in turn including decisions to be evaluated in the form of any suitable format (instruction code, high-level programming/query language, etc.). Wherein in a decision tree one rule can be dependent to another rule in the sense of one result of one rule determines which rule is applied/evaluated next, the set of rules can generally contain any suitable set of also independent rules.

More specifically, a decision tree is evaluated for a light spectrum in the sense that decision tree is applied onto the values of an (input) light spectrum. For example, one individual value of the light spectrum is compared to a respective comparison value and the result of this comparison determines in the tree whether a next comparison is to be evaluated or whether already the tree can be left with a corresponding (first) result.

A more specific example would be P1 representing an intensity of one specific wavelength band, say the first and smallest wavelength value of the spectrum. If this value is lower to a corresponding value (in the example "15"), then already a result can be determined. For example, if a minimum response for this wavelength is smaller than a given value it is unlikely that the mark is authentic, and the result is R=0. Likewise, if evaluation of the input spectrum proceeds to comparing P3, and if P3 meets the respective requirement, the input spectrum can be eventually determined as being authentic (R=1). In general, however, the number of decision levels of the tree can be independent from the number of values in the light spectrum. In this way, also a plurality of light spectrum values can be evaluated in one level of the decision tree (e.g., employing averaging, thresholding, and the like).

According to further embodiments of the present disclosure, more than one decision tree is evaluated leading to a respective number of the so-called first results. As an example, one decision tree is evaluated for the individual (or group-wise accumulated) intensity values, a second decision tree is evaluated for the ratio of two adjacent light spectrum values (e.g. P1/P2, P2/P3, and so forth), and a third decision tree is evaluated for the difference of two adjacent light spectrum values (e.g. P1-P2, P2-P3, and so forth). Of course, any other suitable algebraic operation can be employed to evaluate one or more decision trees.

In general, one decision tree can be built based on collected data. In this way, a number of light spectra can be collected and each spectrum can be tagged as originating from an authentic mark or from some picture/arrangement that has no authentic mark. The tagging can be effected by manually and visually judging the respective authenticity or automatically, such as by utilizing more sophisticated image processing (in the sense of a more processing-intense processing that would not be suitable for the disclosed in-field applications). Yet further, the tagging can also be determined ab initio, meaning that the sample objects used for generating the input spectra are chosen on purpose to be genuine or not.

Taking the values of these input spectra with the known categorization of the spectrum coming from an authentic mark or not, allows one to build the corresponding comparison values of the decision tree. Likewise, algebraic operations can be performed on adjacent values or sets of values for obtaining corresponding comparison values.

In other words, a decision tree is a data mining algorithm for constructing a prediction model from the data. The final model can then be employed for analyzing input data, such as one of the obtained light spectra. Once a decision tree is built, corresponding rules can be extracted, and uploaded to a device in the form parameters or lists, or even rules in some kind of query/instruction language. This approach also allows for updating a tree definition in a device, so that already existing devices can benefit from updated decision tree parameters obtained by considering more and more actual examples with a known authentication tag. In this way, the embodiments of the present disclosure allow for continuously improving authentication reliability in the already existing devices.

Examples for the statistical processing of the light spectrum include correlation, regression, support vector machines, Bayesian statistics, Kernel estimators, neural networks, and distance and related analysis techniques. Moreover, such an analysis can be performed on the raw values of an input light spectrum or on any suitably processed data, such as averaged or smoothed light spectrum values, a first or higher order derivative of the light spectrum values, or the like. An aspect common to said statistical processing is that also some kind of comparison takes place (e.g., threshold values, stored template spectra, etc.) so as to allow for the determination of at least one so-called second result. Again, there can be more than one statistical processing involved leading to respective plurality of second results. For example, a correlation analysis of the raw values of an input light spectrum can be performed providing one second result, and a further correlation analysis of the derivative values of the input light spectrum can be performed providing another second result. The correlation can be made between the measured light spectrum and a stored template or reference spectrum data.

In general, the one or more first results and the one or more second results allow for generating a "final" output result by—for example—a majority voting mechanism. In case of three decision trees and two statistical processing procedures, there will be the odd number of five results, namely three first results and two second results, from which always an output result can be generated. In the case of an even number of results, weighting techniques may be employed for ensuring a reliable output result finding mechanism. In the most general case of having only two results (i.e., one first result and one second result), a simple AND combination and/or again a weighting technique can be employed.

Although detailed embodiments have been described, these only serve to provide a better understanding of the disclosure defined by the independent claims, and are not to be seen as limiting.

The invention claimed is:

1. A method of automated authenticating a mark attached to an item and comprising a marker that emits light under illumination, the method comprising executing by means of a device comprising an acquisition unit, a processing equipment including a processing unit, a memory unit being configured to store code executable by the processing unit, and a communication unit the steps of:

acquiring, by the acquisition unit, a light spectrum from the mark placed in the field of view of the acquisition unit, to provide a light spectrum data comprising values, each value being a light intensity value of the light emitted from the mark for a corresponding wavelength;

analyzing, by the processing equipment, the light spectrum data by:

applying at least two decision trees onto the light intensity values of the light spectrum data to obtain one first intermediate result for each applied decision tree from the at least two decision trees, the first intermediate result indicating whether the mark is authentic or not, wherein each of the at least two decision trees is applied to a different one of the following: a set of individual intensity values, difference, ratio, sum, and derivative of the light intensity values; and applying at least two statistical processings, each of the at least two statistical processings being a statistical processing selected from regression, support vector machines, Bayesian statistics and Kernel estimators, onto the same light intensity values of the light spectrum data to obtain one second intermediate result for each applied processing from the at least two processings, the second intermediate result indicating whether the mark is authentic or not, wherein the statistical processings of the at least two statistical processings differ from each other;

generating, using the processing equipment, an output result indicating whether the mark is authentic or not from the first and second intermediate results, wherein a more indifferent result of the first and second intermediate results is weighted less than a more definite result of the first and second intermediate results, communicating, by a communication unit, the output result to a user.

2. The method of claim 1, wherein the applying of at least one of the at least two of the decision trees comprises comparing a value of the light spectrum to a comparison value, and wherein the comparison values are stored as a parameter list.

3. The method of claim 1, wherein generating the output result comprises a voting mechanism for each one of the first and second intermediate results.

4. The method of claim 1, further comprising controlling illumination of the mark during the acquiring of the light spectrum.

5. A non-transitory medium storing a computer program code executable by a processing unit, the code when executed implementing the method of claim 1.

6. The method of claim 1, wherein the statistical processing is regression.

7. The method of claim 1, wherein an average is calculated from the weighted first and second intermediate results, and if the average exceeds a predetermined value a corresponding output result is generated, wherein the more indifferent result is a result that falls into a predetermined range, and the more definite result is a result that is outside the predetermined range.

8. A device for automated authenticating a mark attached to an item and comprising a marker that emits light under illumination, the device comprising:

an acquisition unit being configured to acquire a light spectrum from the mark placed in the field of view of the acquisition unit, to provide a light spectrum data comprising values, each value being a light intensity value of the light emitted from the mark for a corresponding wavelength;

a processing equipment including a processing unit, a memory unit being configured to store code executable by the processing unit, and a communication unit, the processing equipment being configured to analyze the light spectrum data by applying at least two decision trees onto the light intensity values of the light spectrum data to obtain one first intermediate result for each applied decision tree from the at least two decision trees, the first intermediate result indicating whether the mark is authentic or not, wherein each of the at least two decision trees is applied to a different one of the following: a set of individual intensity values, difference, ratio, sum, and derivative of the light intensity values, and by applying at least two statistical processings, each of the at least two statistical processings being a statistical processing selected from regression, support vector machines, Bayesian statistics and Kernel estimators, onto the same light intensity values of the light spectrum data to obtain one second intermediate result for each applied processing from the at least two processings, the second intermediate result indicating whether the mark is authentic or not, wherein the statistical processings of the at least two statistical processings differ from each other; and to generate an output result indicating whether the mark is authentic or not from the first and second intermediate results, wherein a more indifferent result of the first and second intermediate results is weighted less than a more definite result of the first and second intermediate results; the communication unit being configured to communicate the output result to a user.

9. The device of claim 8, further comprising a sensor receiving means for acquiring the light spectrum and a light source.

10. The device of claim 8, further being arranged as a hand-held device and including a display unit to communicate the output result to a user.

11. The device of claim 8, further being arranged as a fixed device.

* * * * *